April 5, 1966  A. W. GARDES ET AL  3,244,841
OVEN TEMPERATURE CONTROL SYSTEM
Filed Dec. 7, 1962  3 Sheets-Sheet 1
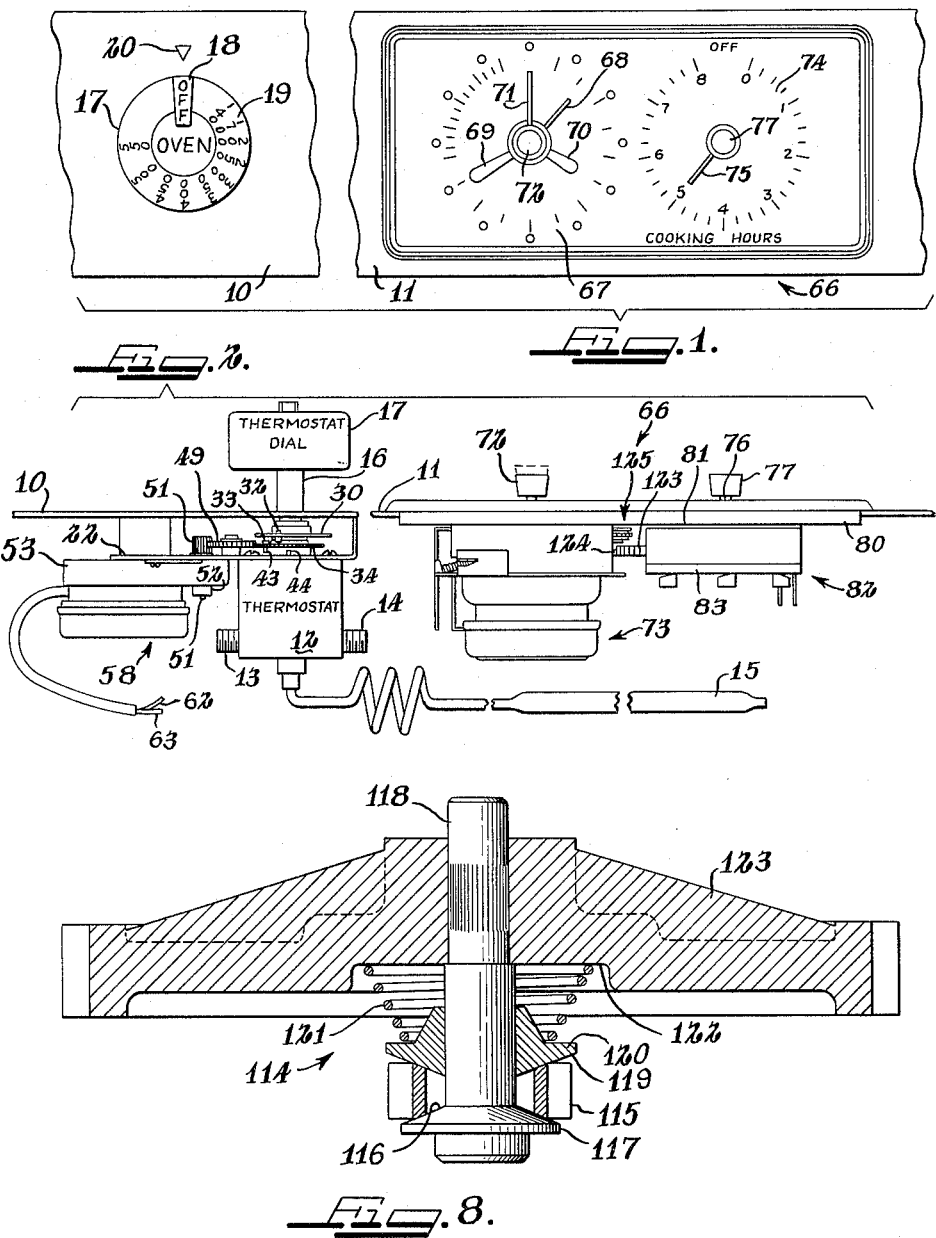
INVENTORS
ALFRED W. GARDES
EDWARD T. PATRICK
BY Robert R Lockwood
Atty.

April 5, 1966  A. W. GARDES ET AL  3,244,841
OVEN TEMPERATURE CONTROL SYSTEM
Filed Dec. 7, 1962  3 Sheets-Sheet 2

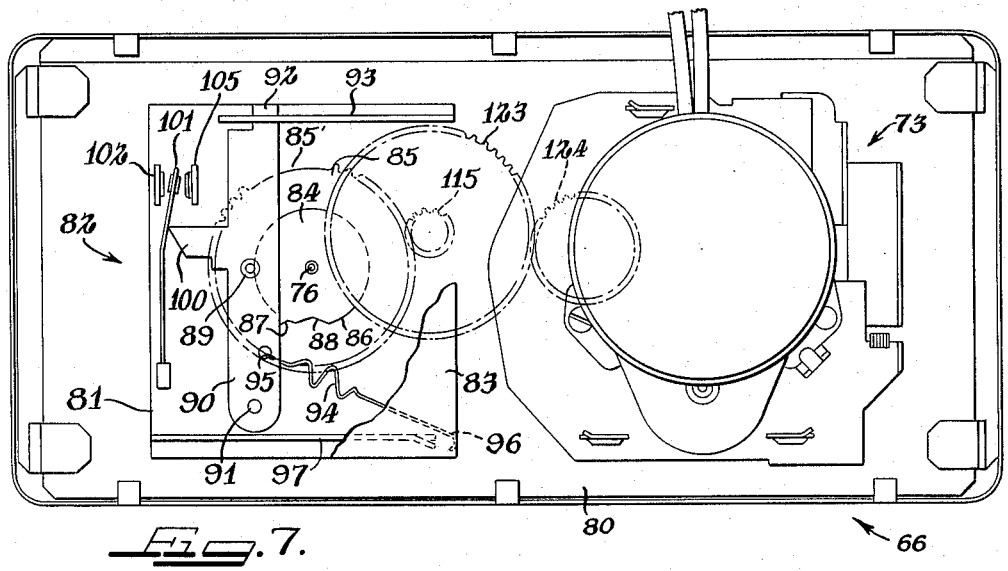
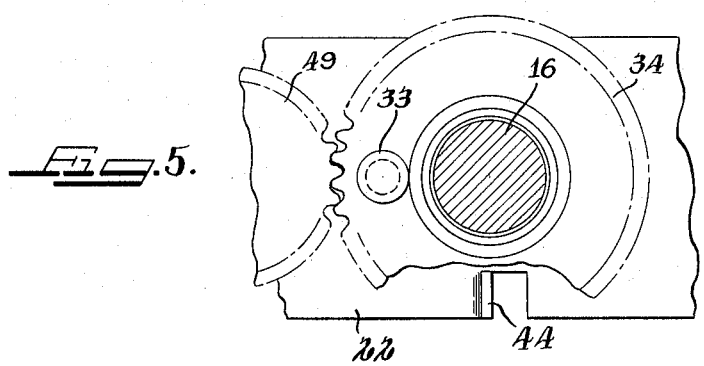
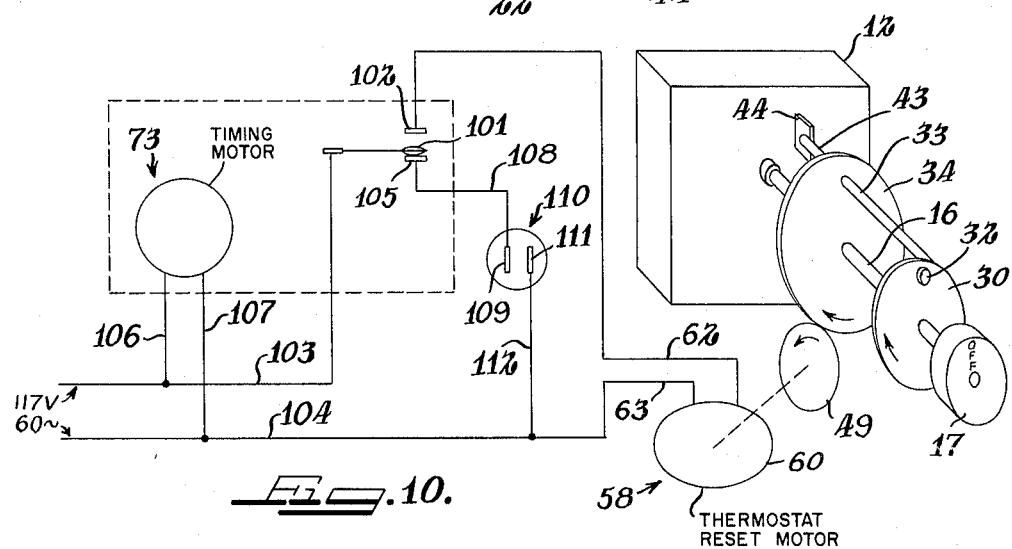

United States Patent Office 3,244,841
Patented Apr. 5, 1966

3,244,841
OVEN TEMPERATURE CONTROL SYSTEM
Alfred W. Gardes, Evanston, and Edward T. Patrick, Chicago, Ill., assignors to International Register Company, Chicago, Ill., a corporation of Illinois
Filed Dec. 7, 1962, Ser. No. 243,036
11 Claims. (Cl. 200—136.3)

This invention relates, generally, to electricity, circuit makers and breakers, and it has particular relation to retarded rotary cam operated circuit makers and breakers.

Among the objects of this invention are: To provide for controlling the temperature of an oven, such as a domestic baking oven, in a new and improved manner; to maintain the oven at a baking temperature of say 350° F. for a predetermined time interval, for example five hours, and at a predetermined time in advance of the end of this interval to reduce the heat supplied to the oven to lower the temperature to a holding temperature, for example a holding temperature of 140° F., and to maintain this holding temperature for an indefinite time; to provide a thermostat for controlling the heat from electrical energy or combustible gas with a manually settable shaft whose operating position corresponds to the oven temperature and to rotate this shaft from a manually preset operating position, corresponding to a baking temperature, to a holding position where the thermostat functions to maintain this holding temperature; to operatively interconnect a thermostat reset electric motor and the manually settable shaft of the thermostat at the time in the time interval above referred to for rotating the shaft from the operating position to the holding position; to employ a gear train between a pinion driven by the thermostat reset electric motor and the thermostat shaft and to hold the pinion out of driving engagement with the gear train except when the field winding of the thermostat reset electric motor is energized; to provide interengaging detents on the terminal gear of the gear train and on the thermostat shaft for transmitting torque from the gear train to the shaft when the thermostat reset electric motor is energized and from the thermostat shaft to the gear train when the former is manually rotated to the operating position; to arrest further rotation of the terminal gear of the gear train when it has rotated the thermostat shaft to the holding position; to control the energization of the thermostat reset electric motor by closure of normally open contacts in response to manual rotation of a circular cam to a position corresponding to the predetermined baking time interval; to rotate the cam at a constant speed by a timing motor that is adapted to operate continuously; to provide a cam surface on the cam that operates through a cam follower to close the normally open contacts at the aforesaid time interval in advance of the end thereof and to hold them closed for a time long enough to rotate the thermostat shaft from any operating position to the holding position; to permit the thermostat reset electric motor to remain energized and to stall for the balance of a resetting period after has rotated the thermostat shaft to the holding position; to hold the cam against rotation at the end of the predetermined time interval for which the cam is manually preset and to provide a clutch between it and the timing motor whereby it is permitted to operate continuously; and to provide normally closed contacts for energizing a service outlet and to open these contacts when the cam is manually preset and to reclose them at the end of the predetermined time interval for which the cam is manually preset.

In the drawings:

FIG. 1 is a view, in front elevation, of panel sections of a stove or oven on which the control devices of the present invention can be mounted, it being understood that the panel sections may be contiguous or separated as desired.

FIG. 2 is a bottom plan view of the mechanisms shown in FIG. 1.

FIG. 5 is a vertical sectional view taken generally along the line 5—5 of FIG. 4.

FIG. 7 is an elevational view of the timing mechanism, certain parts being broken away in order to show more clearly the details of construction.

FIG. 8 is a horizontal sectional view at an enlarged scale of the slip clutch mechanism that is interposed in the gear train between the timing motor of the timing mechanism and the cam that is manually preset and is driven thereby.

FIG. 10 is a diagrammatic showing of the circuit connections that are employed in practicing this invention together with a diagrammatic showing of the thermostat and the gear train associated therewith.

Figure 3:
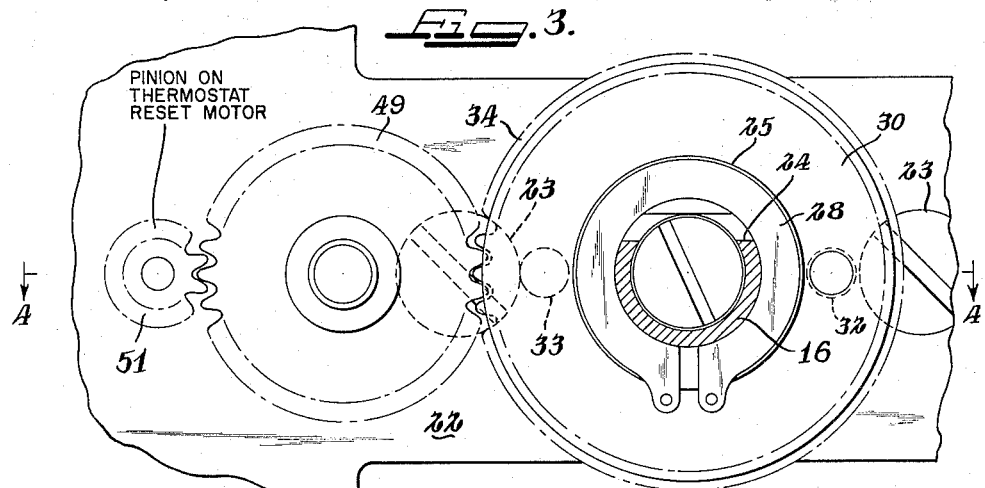
FIG. 3 is a view taken generally along the line 3—3 of FIG. 4 and shows a portion of the gear train through which the thermostat reset electric motor drives the thermostat shaft.

Referring now particularly to FIGS. 1 and 2 of the drawings, it will be observed that the reference characters 10 and 11 designate, respectively, panel sections of a stove or oven which may or may not be contiguous depending upon the location of the oven with respect to the timer. Mounted on the panel section 10 is a thermostate that is indicated, generally, at 12. While the present invention contemplates the control of a thermostat, such as the thermostat 12, arranged to control the flow of combustible gas to an oven for maintaining a preset temperature, it will be understood that this invention can be employed in connection with a thermostat that is arranged to control the flow of electrical energy to an oven for heating it and maintaining the temperature thereof at a preset temperature. For illustrative purposes the thermostat 12 is shown as being provided with a gas inlet 13 from a suitable supply of gas under pressure and a gas outlet 14 that is connected to the heating unit of the oven. A conventional temperature probe 15 is located in the oven and it is connected to control the operation of the thermostat 12 in conventional manner for varying the amount of gas that flows to the gas outlet 14 in accordance with the temperature sensed by the temperature probe 15. The temperature that is maintained by the thermostat 12 can be manually preset by a thermostat shaft 16.

Figure 4:
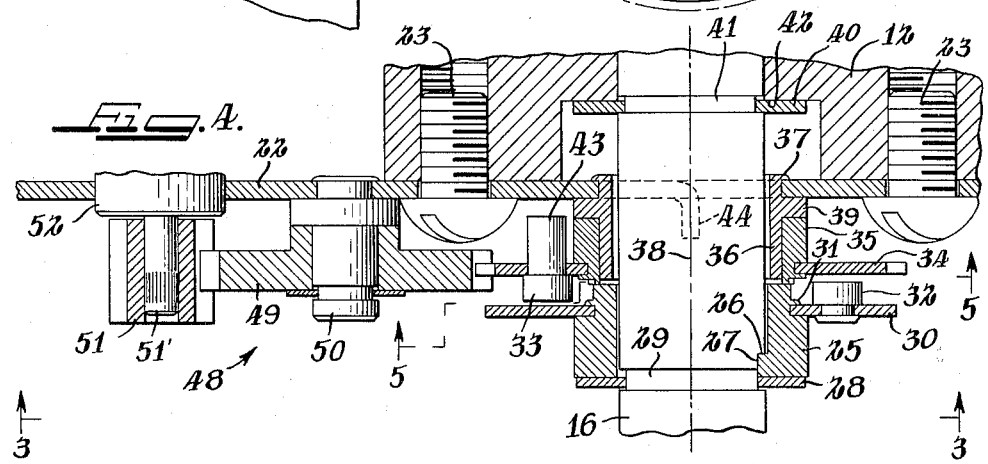
FIG. 4 is a horizontal sectional view taken generally along the line 4—4 of FIG. 3.

The present invention has to do particularly with controlling the position of the thermostat shaft 16. In order to permit it to be manually preset for maintaining the desired temperature of the oven a thermostat dial 17 is mounted on the shaft 16. It off position is indicated at 18 in FIG. 1. The thermostat dial 17 is provided with a scale 19 that is moved on rotation of the shaft 16 relative to an index 20 on the panel section 10. It will be understood that no gas is supplied to the oven when the thermostat dial 17 occupies the position shown in FIG. 1 where the off indication registers with the index 20. On manual rotation of the thermostat dial 17 in a counterclockwise direction to a position such as a position where the 350° F. point on the scale 19 registers with the index 20, the thermostat 12 will function to maintain the temperature of the oven at this value. Other temperatures are maintained depending upon the setting of the thermostat dial 17 as will be understood. The particular thermostat setting and the time that it is maintained at this setting of course depend upon the baking conditions in the oven that it is desired to maintain. For illustrative purposes it is assumed that the baking temperature is 350° F. and it is desired to maintain this temperature for a baking period of five hours. At the end of this baking period it is desired that the temperature be such as to maintain the oven at a holding temperature in the event that it is not desired at that time to remove the contents of the oven. In accordance with this invention provision is made for rotating the thermostat shaft 16 from the position to which it is manually preset to a position that corresponds to a holding temperature that may be 140° F. Since the oven, after operating for a number of hours at the baking temperature of 350° F., has substantial stored heat, provision is made for moving the thermostat shaft 16 to the holding position in advance of the end of the desired baking period. For example, thirty minutes in advance of the end of the desired baking time the arrangement is such that the thermostat shaft 16 is rotated to a position corresponding to the holding temperature so that advantage can be taken of the heat stored in the oven and associated parts that in effect will maintain the baking conditions for the complete baking period. The arrangement is such that the holding temperature will be maintained for an indefinite period and until the thermostat dial 17 is returned manually to the off position. FIGS. 2, 3 and 4 of the drawings show how the thermostat shaft 16 is operated to accomplish the foregoing control of the oven. Here it will be observed that a metallic support plate 22 is provided that may be secured by any suitable means to the rear side of the panel section 10. The support plate 22 has screws 23–23 extending therethrough and into the frame of the thermostat 12 for mounting it in position thereon with the thermostat shaft 16 extending therethrough. A portion of the thermostat shaft 16 is slabbed off as indicated at 24 in FIG. 3 to facilitate non-rotatably mounting the thermostat dial 17 thereon. The shaft 16 is of tubular construction.

In order to provide for rotating the thermostat shaft 16 from any position to which it is manually preset or from an operating position to the holding position a sleeve 25 is non-rotatably mounted thereon in spaced relation to the support plate 22. For this purpose the sleeve 25 has a shoulder portion 26 formed integrally therewith and extending radially inwardly to bear against a flat surface 27 on the thermostat shaft 16. The sleeve 25 is held against endwise movement in a direction away from the support plate 22 by a retaining snap ring 28 which is positioned in an annular groove 29 in the thermostat shaft 16. Rotatable with the sleeve 25 is a drive disc 30 that is staked thereto as indicated at 31. Extending laterally from the driven disc 30 toward the support plate 22 is a driven pin or detent 32 that is located in the path of a drive pin or detent 33 which is carried by a drive or terminal gear 34 that is secured to a bushing 35 which is arranged to rotate freely on a sleeve 36 which is staked at 37 to the support plate 22. It will be observed that the drive or terminal gear 34 and bushing 35 are arranged to rotate about an axis indicated by the broken line 38 which is the axis of rotation of the thermostat shaft 16. Formed integrally with the sleeve 36 is a shoulder 39 which bears against the juxtaposed surface of the support plate 22 on one side while the other side provides a reaction surface to prevent endwise movement of the bushing 35. The other end of the bushing 35 bears against the juxtaposed end of the sleeve 25 and thus spaces the latter from the support plate 22. Movement of the thermostat shaft 16 toward the support plate 22 is limited by a snap ring 40 that is located in an annular groove 41 on the thermostat shaft 16 and bears against a shoulder 42 on the housing of the thermostat 12. In this manner the thermostat shaft 16 is prevented from having endwise movement while it is rotatable about its axis 38. In addition the driven disc 30 rotates conjointly with the thermostat shaft 16 while the bushing 35 is freely rotatably mounted on the sleeve 36 and thus can rotate freely relative to the thermostat shaft 16 except as prevented by engagement of the driven and drive pin or detents 32 and 33 in a manner to be described.

With a view to limiting the rotation of the drive or terminal gear 34 in a position corresponding to the holding position of the thermostat shaft 16 the drive pin or detent 33 has a projecting end 43 that is arranged to engage a stop 44 in the form of a lug that is struck from the support plate 22. The arrangement is such that the drive or terminal gear 34 rotates through less than a complete revolution to return the thermostat shaft 16 from the operating position to the holding position. Thus ample provision is made for permitting rotation of the drive or terminal gear 34 to any position corresponding to any operating position of the thermostat shaft 16.

For rotating the drive or terminal gear 34 a gear train, shown generally at 48, is employed. The gear train 48 includes a gear 49 that is rotatably mounted on a stud 50 that extends from the support plate 22. Meshing with the teeth of the gear 49 is a pinion 51 which is mounted for rotation on a shaft 51' that is journaled in a sleeve 52 that extends through the support plate 22. The sleeve 52 extends from a gear casing 53, FIGS. 2 and 6, in which are located additional gears of the gear train 48 with one of them being indicated by broken lines at 54. The gear train 48 and particularly the gear 54 are driven by a pinion 55 that is secured to a shaft 56 that is movable endwise in a bearing 57 of a thermostat reset electric motor, shown generally at 58. Except for the provision for endwise slidably mounting the shaft 56 the details of construction of the thermostat reset electric motor are conventional and may be in accordance with W. P. Gallagher Patent No. 2,681,444, issued June 15, 1954. The motor 58 includes a rotor 59 that is secured to and movable endwise with the shaft 56. It is arranged to be rotated by a field winding 60 which functions in conjunction with a magnetic circuit as described in the Gallagher patent. In order to hold the pinion 55 out of driving engagement with the gear 54 a spring 61 is interposed between the under side of the rotor 59 and the upper end of the bearing 57. As long as the field winding 60 remains unenergized, the spring 61 serves to hold the rotor 59 in the position shown in FIG. 6 with the pinion 55 out of driving engagement with the gear 54. On energization of the field winding 60, the rotor 59 is moved to a position of minimum reluctance and toward the field winding 60 with the result that the pinion 55 is moved to driving engagement with the gear 54 and thus through the gear train 48 acts to rotate the drive or terminal gear 34. As soon as the field winding 60 is deenergized, the spring 61 moves the rotor 59 to the position shown in FIG. 6 where the pinion 55 is out of driving engagement with the gear 54. By interrupting the driving connection from the motor 58 to the gear train 48 it is unnecessary to rotate manually the rotor 59 when the thermostat shaft 16 is rotated to the preset or operating position under conditions where the driven pin or detent 32 is in engagement with the drive pin or detent 33 so that rotation of the gear train 48 is necessary. This would be difficult to accomplish if the pinion 55 remained in engagement with the gear 54 of the gear train 48 because of the gear ratio therebetween.

The field winding 60 is energized over conductors 62 and 63 from a suitable alternating current source under the control of a switch mechanism to be described.

As described hereinbefore it is desirable to rotate the thermostat shaft 16 from the operating position to which it is manually preset to the holding position at a time in advance of the end of the desired baking period. For this purpose a timing mechanism, shown generally at 66, and mounted on the panel section 11 is employed. As shown in FIG. 1 the timing mechanism 66 includes a conventional clock face 67 with respect to which a second hand 68, a minute hand 69 and an hour hand 70 are arranged to rotate. Also included is an interval pointer 71 that can be positioned by a set knob 72 which is employed for presetting the position at which a buzzer that forms a part of a timing motor, shown generally at 73, can be set to operate. The timing motor 73 is of the general type described in the patent above referred to which also describes the buzzer construction. The motor 73 is shown in FIGS. 2 and 7 and diagrammatically in FIG. 10.

Figures 6, 9:
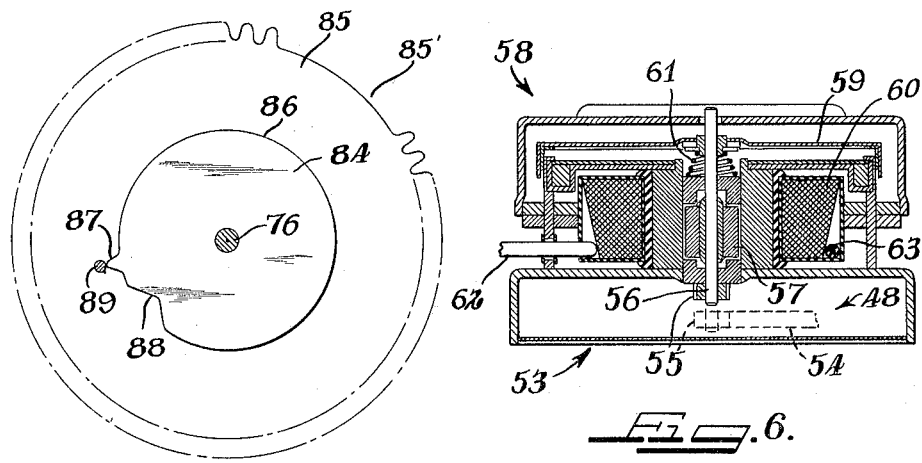
FIG. 6 is a horizontal sectional view through the thermostat reset electric motor and shows how the rotor thereof is arranged to be attracted on energization of the field winding to move the pinion driven by the rotor into operative engagement with a gear train.
FIG. 9 is an elevational view at an enlarged scale of the cam and the gear which drives the same.

The timing mechanism 66, as seen in FIG. 1, also includes a cooking hour face 74 which, as indicated, is provided with an eight hour cooking scale and a pointer 75 which is mounted on a shaft 76, FIGS. 2, 7 and 9, on which a set knob 77 also is mounted for positioning the pointer 75 to the desired number of cooking hours.

The shaft 76 which carries the pointer 75 extends through a rear plate 80 of the timing mechanism 66 and through a support plate 81 of a cam switch mechanism that is indicated, generally, at 82 in FIG. 7. The shaft 76 also extends through a rear plate 83 of insulating material with the construction being such that the shaft 76 is journaled in the support plate 81 and the rear plate 83. Mounted on and rotatable with the shaft 76 is a cam 84, FIG. 9, and a gear 85. The cam 84 has a circular cam surface 86 about the major portion of its periphery. Also it has a control surface raised portion 87 and a control surface 88 in the form of a notch. The cam 84 is arranged to control the position of a cam follower 89, FIG. 7, that is carried by a cam follower arm 90 which is pivoted at its lower end at 91 on a shaft that extends between the plates 81 and 83. The upper end 92 of the cam follower arm 90 is guided in a slot in an upper wall 93 which extends from the upper edge of the support plate 81. A coil tension spring 94 is connected at 95 to the cam follower arm 90 and is anchored at 96 to one end of a bottom wall 97 that extends from the support plate 81. The construction is such that the coil tension spring 94 holds the cam follower 89 in engagement with the periphery of the cam 84. When the cam follower 89 is in engagement with the circular cam surface 86, the cam follower 89 and thereby the cam follower arm 90 occupies an intermediate position between a position which corresponds to that shown in FIG. 9 where the cam follower 89 has been moved by the control surface 87 to one position and has further tensioned the spring 94. When the cam 84 is rotated to position the cam follower 89 in the bottom of the notch which provides the control surface 88, the spring 94 moves the cam follower arm 90 to another position which is inwardly of the position shown in FIG. 9 and also inwardly of the position occupied by the cam follower arm 90 when the cam follower 89 engages the circular cam surface 86.

The movement of the cam follower arm 90 is employed for controlling the energization of the field winding 60 of the thermostat reset electric motor 58. For this purpose a contact operating finger 100 extends laterally from the cam follower arm 90, as shown in FIG. 7, and it is arranged to control the position of a movable contact 101 which is shown diagrammatically in FIG. 10. Associated with the movable contact 101 is a front stationary contact 102 that is connected by the conductor 62 to the field winding 60. The movable contact 101 is connected by a conductor 103 to one terminal of a suitable source of alternating current such as 117 volt, 60 cycle source. The other conductor to the source is indicated at 104 and it is connected to the conductor 63 to complete the energizing circuit for the field winding 60.

Advantage is taken of the fact that the cam follower 89 is returned to the notch provided by the control surface 88 at the end of the time indicated by the pointer 75 for the cooking hours. Although the primary function of the control system is to control the energization of the field winding 60 for the thermostat reset electric motor 58 it is possible by providing a back contact 105 that is closed when the cam follower 89 returns to the notch provided by the control surface 88 to complete an energizing circuit which includes a conductor 108 that is connected to one terminal 109 of a service outlet which is indicated, generally, at 110. Another terminal 111 of the service outlet 110 is connected by conductor 112 to the conductor 104. Thus it is possible to plug a device such as a coffee maker into the service outlet 110 either for immediate energization or to be energized at the end of the interval for which the cooking hours pointer 75 is set. As long as the cooking hours pointer 75 is in the initial or zero position, the circuit is completed to energize the terminals of the service outlet 110 and it can be used as an ordinary outlet. Also, as indicated, it can be used in conjunction with the timing mechanism 66 under the control of the cam 84 as set by the knob 77 to be energized at the end of any interval up to an eight hour interval when the particular construction disclosed herein is employed.

It remains to describe how the cam 84 and gear 85 rotatable therewith are returned from the position to which they are manually preset to the initial position. For this purpose a slip clutch connection, shown generally at 114 in FIG. 8 is employed. The clutch 114 includes a pinion 115 in the form of a ring which is in driving engagement with the gear 85. One side of the pinion 115 engages a conical surface 116 of a flange 117 that is fast on a shaft 118 the ends of which are journaled in the plates 81 and 83 of the cam switch mechanism 82. The other side of the ringlike pinion 115 bears against a conical surface 119 of a washer 120 that is slidably mounted on the shaft 118. A coil compression spring 121 serves to urge the washer 120 toward the flange 117 and to slidingly grip the pinion 115 therebetween with sufficient force to transmit torque from the shaft 118 to the pinion 115 and thence to the gear 85 for rotating the cam 84. However, the arrangement is such that, when the cam 84 has been rotated to the off position where the cam follower 89 is at the bottom of the notch provided by the control surface 88, sufficient force is applied thereto which prevents further rotation of the cam 84. As seen in FIG. 9 a section of the teeth on the gear 85 is omitted at 85' which is opposite the bottom of the notch. This position of the gear 85 places the section 85' opposite the pinion 115 which continues to rotate with the shaft 118 but without driving the gear 85. One end of the coil compression spring 121 bears against the washer 120 while the other end bears against a flat surface 122 of a gear 123 which is fast on the shaft 118. As shown in FIG. 7 the gear 123 is driven by a gear 124 which forms a part of the reduction gear train, shown generally at 125, FIG. 2, that is driven by the timing motor 73 for rotating the second hand 68, minute hand 69 and hour hand 70 in conventional fashion. For illustrative purposes it is pointed out that the construction of the gear train 125 is such that the gear 124 forming a part thereof is rotated at a speed of one revolution per hour. It drives through the gear 123 and clutch 114 to rotate the gear 85 and cam 84 at a speed of one-ninth revolution per hour. It will be understood that these figures are representative of speeds that can be used in practicing the present invention.

In describing the operation of the control system for the thermostat reset electric motor 58 it will be assumed that the thermostat dial 17 is in the off position as shown at 18 in FIG. 1 of the drawings. Also it will be assumed that, as a result of a previous resetting operation, the projection end 43 of the drive pin or detent 33 carried by the drive or terminal gear 34 is in engagement with the stop 44. Also it will be assumed that the cooking time is set by positioning the pointer 75 to the five hour interval shown in FIG. 1. When the set knob 77 is rotated to the five hour position, the shaft 76, FIG. 7, is rotated to rotate the cam 84 and gear 85 to a corresponding position. When this takes place, the cam 84 is rotated in a counterclockwise direction to position the cam follower 89 on the circular cam surface 86 in a position somewhat as illustrated in FIG. 7. In so doing the cam follower 89 is moved out of the notch provided by the control surface 88 and the movable contact 101 is moved out of engagement with the back contact 105. This opens the circuit to the service outlet 110 and the movable contact 101 is operated to the intermediate position shown in FIG. 7 where it is out of engagement with the front stationary contact 102. During the setting of the cam 84 and gear 85, the teeth on the latter engage the teeth on the pinion 115, which forms a part of the clutch 114, and it slips with respect to the conical surfaces 116 and 119.

Then the thermostat dial 17 is rotated to the operating position such as a position where the 350° F. indication registers with the index 20. This is accompanied by rotation of the thermostat shaft 16 which carries with it the driven disc 30 and driven pin or detent 32. The thermostat shaft 16 is rotated in a counterclockwise direction as viewed in FIG. 3 to the operating position. During the initial portion of the rotation to the operating position the driven pin or detent 32 is rotated to approach the drive pin or detent 33 the projecting end 43 of which had previously been stopped by engagement with the stop 44. The continued rotation of the thermostat shaft 16 in the counterclockwise direction causes the drive or terminal gear 34 to be rotated in the same direction together with the gears making up the gear train 48. It will be recalled that the pinion 55, FIG. 6, of the thermostat reset electric motor 58 is out of engagement with the last gear 54 of the gear train 48. Thus the rotation of the thermostat shaft 16 to the operating position or to the 350° position, for example, is accompanied by rotation of the drive or terminal gear 34 and the gear train 48 in driving connection therewith.

It will be understood that the gear 124 which forms a part of the gear train 125 that is driven by the timing motor 73 rotates continuously. Because of the interposition of the clutch 114 between the gear 123 and the gear 85, it was possible to rotate the latter on rotation of the set knob 77 to position the cam 84 at a location corresponding to the cooking hours, for example the five hour position.

The continued rotation of the gear 123 as driven by the timing motor 73 causes the gear 85 and cam 84 to be rotated in a clockwise direction. In the meantime the thermostat 12 is functioning to maintain the temperature of the oven at the preset temperature.

It will be observed that the control surface 87 provided by the raised portion on the cam 84 is arranged to engage the cam follower 89 at a time in advance of the time that the cam follower 89 engages the notch provided by the control surface 88 at the end of the baking time. When this takes place the cam follower 89 causes the cam follower arm 90 to be rocked about the pivot 91 sufficiently to move the movable contact 101 into engagement with the front stationary contact 102. As soon as this takes place it will be apparent from a consideration of FIG. 10 that the field winding 60 of the thermostat reset electric motor 58 is energized. The rotor 59 is attracted toward the field winding 60 against the biasing action of the spring 61 and the pinion 55 is moved into driving engagement with the gear 54 that forms a part of the gear train 48. As a result the torque from the thermostat reset electric motor 58 is transmitted to the drive or terminal gear 34 which carries the drive pin or detent 33 that is in engagement with the driven pin or detent 32 on the drive disc 30 which is fast on the thermostat shaft 16. The thermostat shaft 16 then is rotated in a clockwise direction from the operating position and this rotation continues until the projecting end 43 of the drive pin or detent 33 engages the stop 44. No further rotation of the drive or terminal gear 34 is permitted and, even though the field winding 60 remains energized, the thermostat reset electric motor 58 is stalled and continues to be stalled until the continued rotation of the cam 84 as driven by the gear 85 moves the control surface 87 out of engagement with the cam follower 89. As soon as this takes place the spring 94 retracts the cam follower arm 90 and the movable contact 101 disengages the front stationary contact 102 and moves to the intermediate position shown in FIG. 7. The gear 85 and cam 84 continue to rotate until at the end of the cooking period the cam follower 89 engages the notch provided by the control surface 88 whereupon the movable contact 101 engages the back stationary contact 105 to complete the energizing circuit for the service outlet 110.

As soon as the movable contact 101 disengages the front stationary contact 102, the energizing circuit to the field winding 60 is opened and the rotor 59 no longer is attracted thereto. The spring 61 moves it and the pinion 55 to the position shown by full lines in FIG. 6.

Now the thermostat 12 continues to operate and maintain the temperature of the oven at the holding temperature which can be assumed for present purposes to be 140° F. When the oven is to be completely shut off, the thermostat dial 17 is rotated from the holding position to the off position shown in FIG. 1. During this portion of the rotation of the dial 17 and of the thermostat shaft 16 the driven pin or detent 32 rotates away from the drive pin or detent 33.

It is desirable, as set forth above, that the clutch 114 be required to slip only during the time that the set knob 77 is rotating the shaft 76 to position the pointer 75 to the desired number of cooking hours. This is accomplished by omitting some of the gear teeth along the periphery of the gear 85 as indicated at 85' in FIG. 9. The arrangement is such that, when the cam follower 89 is in the notch provided by the control surface 88 and the pointer 75 is in the off cooking hours position, the toothless portion 85' of the gear 85 is opposite the teeth of the pinion 115. Thus the pinion 115 has no load applied thereto and can rotate together with the gear 123.

What is claimed as new is:

1. In a system for controlling the temperature of an oven, such as a domestic oven, having an adjustable thermostat responsive to the oven temperature to control heat supplied thereto for maintaining said temperature at a preset value, a thermostat setting member movable to an operating position in which heat is supplied to said oven to maintain a cooking temperature corresponding to said operating position, and a thermostate reset electric motor for shifting said thermostat setting member, in combination, timing mechanism including manually settable cooking hours means, and means operated by said manually settable cooking hours means for energizing said thermostat reset electric motor to shift said thermostate setting member and thereby said thermostat from said operating position at the end of the interval for which said manually settable cooking hours means is set.

2. In a system for controlling the temperature of an oven, such as a domestic oven, having an adjustable thermostat responsive to the oven temperature to control heat supplied thereto for maintaining said temperature at a preset value, a thermostat setting member movable to an operating position in which heat is supplied to said oven to maintain a cooking temperature corresponding to said operating position, and a thermostat reset electric motor for shifting said thermostat setting member, in combination, timing mechanism including manually settable cooking hours means, normally open contacts arranged when closed to complete and energizing circuit for said thermostat reset electric motor, a cam rotatable with said manually settable cooking hours means and a cooperating cam follower for closing said contacts, and a timing motor for driving said cam.

3. The invention, as set forth in claim 2, wherein, the cam includes a control surface portion that cooperates with the cam follower to close the contacts at a time determined by the position of said cam as set by the cooking hours means and for an interval of time long enough to move the thermostat setting member from one operating position to another operating position.

4. The invention, as set forth in claim 3, wherein the cam includes another control surface that cooperates with the cam follower after the contacts have been closed and then opened to prevent further rotation of said cam by the timing motor, and a clutch is interposed between said timing motor and said cam that permits the former to continue in operation while the latter is held against further rotation.

5. The invention, as set forth in claim 4 wherein the system includes a service outlet, normally closed contacts that complete an energizing circuit for said service outlet, and the cam and cam follower control the operation of said normally closed contacts to open them when said cam is rotated by the manually settable cooking hours means and to close them when said cam is prevented from further rotation by the timing motor.

6. In a system for controlling the temperature of an oven, such as a domestic oven, having an adjustable thermostat responsive to the oven temperature to control heat supplied thereto for maintaining said temperature at a preset value, a thermostat setting member in the form of a rotatable shaft movable to an operating position in which heat is supplied to said oven to maintain a cooking temperature corresponding to said operating position, and a thermostat reset electric motor for shifting said thermostat setting member, in combination, timing mechanism including manually settable cooking hours means, a driven detent secured to said shaft, a drive gear driven by said thermostat reset electric motor and mounted for rotation about the axis of rotation of said shaft and independently thereof, a drive detent carried by said drive gear and positioned in the path of said drive detent, and a stop cooperating with said drive detent to prevent further movement thereof by said thermostat reset electric motor when it has moved said thermostat setting shaft away from said operating position.

7. The invention, as set forth in claim 6 wherein means interrupt the drive between the thermostat reset electric motor and the drive gear whereby the shaft can be rotated manually to the operating position together with said drive gear independently of said thermostat reset electric motor.

8. The invention, as set forth in claim 6 wherein the thermostat reset electric motor includes a field winding and a rotor mounted on an endwise slidable rotor shaft on which a pinion is mounted, a gear train interconnects said pinion and the drive gear, and spring means bias said rotor and rotor shaft endwise to hold said pinion out of driving engagement with said gear train as long as said field winding is deenergized.

9. In a system for controlling the temperature of an oven, such as a domestic oven, having an adjustable thermostat responsive to the oven temperature to control heat supplied thereto for maintaining said temperature at preset values, a thermostat setting member movable to an operating position in which heat is supplied to said oven to maintain a cooking temperature corresponding to said operating position and movable to a holding position in which heat is supplied to said oven to maintain a holding temperature that is substantially less than said cooking temperature, and a thermostat reset electric motor for shifting said thermostat setting member from said operating position to said holding position, in combination, timing mechanism including manually settable cooking hours means, and means operated by said manually settable cooking hours means at a time determined by the cooking period for which said cooking hours means is set for energizing said thermostat reset electric motor to shift said thermostat setting member from said operating position to said holding position.

10. In a system for controlling the temperature of an oven, such as a domestic oven, having an adjustable thermostat responsive to the oven temperature to control heat supplied thereto for maintaining said temperature at preset values, a thermostat setting member movable to an operating position in which heat is supplied to said oven to maintain a cooking temperature corresponding to said operating position and movable to a holding position in which heat is supplied to said oven to maintain a holding temperature that is substantially less than said cooking temperature, and a thermostat reset electric motor for shifting said thermostat setting member from said operating position to said holding position, in combination, timing mechanism including manually settable cooking hours means movable from an initial position to a position corresponding to a selectable cooking hours position, a timing motor connected to said manually settable cooking hours means for operating it from a selected cooking hours position to said initial position, and means operated by said manually settable cooking hours means in said initial position for energizing said thermostat reset electric motor to shift said thermostat setting member from said operating position to said holding position.

11. In a system for controlling the temperature of an oven, such as a domestic oven, having an adjustable thermostat responsive to the oven temperature to control heat supplied thereto for maintaining said temperature at preset values, a thermostat setting member movable to an operating position in which heat is supplied to said oven to maintain a cooking temperature corresponding to said operating position and movable to a holding position in which heat is supplied to said oven to maintain a holding temperature that is substantially less than said cooking temperature, and a thermostat reset electric motor for shifting said thermostat setting member from said operating position to said holding position, in combination, timing mechanism including manually settable cooking hours means movable from an initial position to a position corresponding to a selectable cooking hours position, a timing motor connected to said manually settable cooking hours means for operating it from a selected cooking hours position to said initial position, normally open contacts arranged when closed to complete an energizing circuit for said thermostat reset electric motor, a cam rotatable with said manually settable cooking hours means, and a cooperating cam follower for closing said contacts and energizing said thermostat reset electric motor to shift said thermostat setting member from said operating position to said holding position when said manually settable cooking hours means is returned to said initial position.

References Cited by the Examiner

UNITED STATES PATENTS

| | | | |
|---|---|---|---|
| 2,334,040 | 11/1943 | Schellens | 310—164 |
| 2,668,589 | 2/1954 | Illian | 200—38 |
| 2,801,799 | 8/1957 | McColloch | 236—46 |
| 2,855,477 | 10/1958 | Ullman | 200—27 |
| 3,082,301 | 3/1963 | Barber | 200—38 |

BERNARD A. GILHEANY, *Primary Examiner.*

ALDEN D. STEWART, *Examiner.*